July 29, 1952  J. G. FORD  2,605,245
PACKING COMPOSITION
Filed June 30, 1949

WITNESSES:
E.A. McCloskey.
Nw. C. Groome

INVENTOR
James G. Ford.
BY
Ezra W. Savage
ATTORNEY

Patented July 29, 1952

2,605,245

UNITED STATES PATENT OFFICE 2,605,245

PACKING COMPOSITION

James G. Ford, Sharon, Pa., assignor to Westinghouse Electric Corporation, East Pittsburgh, Pa., a corporation of Pennsylvania Application June 30, 1949, Serial No. 102,288

2 Claims. (Cl. 260—27)

The invention relates generally to packing material for joints, and more specifically to packing material for joints which are exposed to oil.

In the manufacture of apparatus which must contain oil or similar liquids, a great deal of difficulty has been experienced in so packing inlets and outlets that oil will not leak out and be lost. In the case of electrical apparatus, for example, such as transformers which use oil as a dielectric and cooling medium, connections have to be made between the transformer case and radiators and the top and bottom filter press valves and drain valves and these connections must be packed.

In order to meet manufacturing and operating conditions, different types of joints have to be employed. In the manufacture of transformers, for instance, the connections to inlets or outlets are usually made with threaded members, while in making the tanks, rolled seams are often employed.

In packing threaded joints in such apparatus, many different kinds of cement have been utilized. It is common practice to use solutions of shellac, phenolic resins, alkyd resins and many natural gums. In such cements, the solids content is usually low and voids may result when a certain amount of the solvent has evaporated and a leaky joint is the result.

When transformers and other similar apparatus are sold and delivered to a customer, one of the first things that the customer feels obliged to do is to tighten all the joints. In this tightening operation, the cement which has hardened in the joints or adhered to the parts is cracked and will not reseal with the result that oil leaks are developed.

The object of the present invention is to provide a packing composition which on being exposed to liquids, swells and renders the packing effective.

It is also an object of the invention to provide a packing material which can be prepared in the form of a paste to facilitate application.

Other objects of the invention will, in part, be obvious and will, in part, appear hereinafter.

The invention accordingly comprises a composition of matter possessing the characteristics, properties and the relation of components which will be exemplified in the composition hereinafter described and the scope of the application of which will be indicated in the claims.

Figure 1:
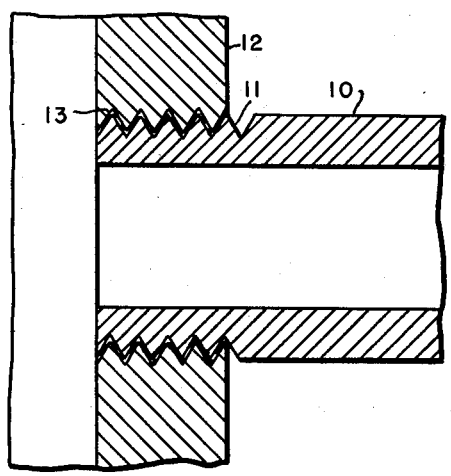
Figure 2:
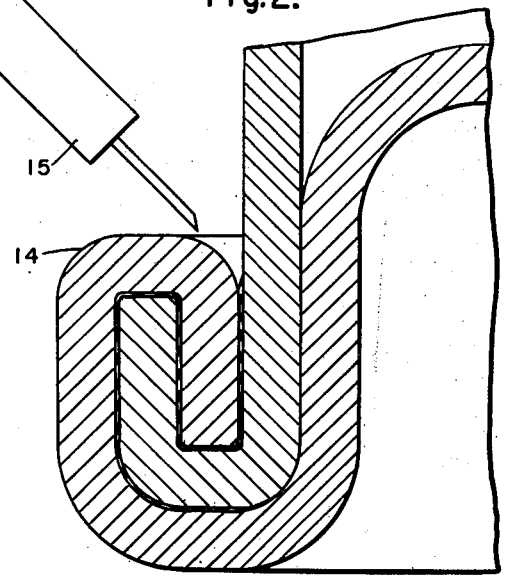

For a fuller understanding of the nature and objects of the invention, reference should be had to the following detailed description taken in connection with the accompanying drawing, in which:

Figure 1 is a view partly in side elevation and partly in section of a transformer outlet showing how the packing composition may be applied and one type of joint to which it is applied; and Fig. 2 is a view partly in elevation and partly in section of a rolled joint, such as used in making a transformer tank showing the packing composition applied.

In the present invention one of the inventive thoughts in providing a new packing material or composition of matter for sealing joints involved the selection of a material which when exposed to the liquid to be sealed off will swell, thus tightly closing a joint or seam. In a preferred modification of this invention in order to tightly seal a joint or seam against oil, and particularly hot oil, an elastomer, such for example, as a synthetic or natural rubber or mixtures of these rubbers is embodied in the packing or composition of matter, as the swelling agent. If the joint or seam is to be tightly sealed against some other liquid than oil, a different swelling agent may be employed.

In the sealing of a joint against the flow of liquids, such as oil, advantages result from bonding the packing material to the members of the joint, which are usually metal but which in the present day may be made from some other materials, such as plastics. In the preferred embodiment of the invention, which will be described hereinafter, the parts of the joint or seam are metal, and a resin is used for bonding the rubbers to the parts. When the joint has to be sealed against oil, a resin, which is substantially insoluble in oil, is employed. Otherwise, the resin might be dissolved into the body of the oil.

In order to get the most desirable mixture of the comminuted rubbers and resins to effect an adequate sealing of the rubber particles to one another and other parts of the joint, a solvent for the resins, which will not affect the rubbers, is employed. In this way, the resins may be thoroughly distributed through the comminuted rubbers.

In the preparation of the packing material or composition of matter of this invention, a finely divided or comminuted elastomer, such as either a synthetic or natural rubber or mixtures of such rubbers, is selected. The selection will depend to a considerable extent on the conditions of use for which the material is to be provided. The particle size of the comminuted rubber is important and will depend to a considerable extent on the type of joint to be sealed. There is now available on the market a comminuted synthetic rubber, which has a fineness of the order of 100 mesh. This 100 mesh rubber has been employed in the sealing of joints with success. However, it is to be understood that coarser and more finely divided rubber may be utilized. For some applications, rubber of the fineness of 500 mesh may be desirable. Further, elastomers, which are of a particle size coarser than 100 mesh, give good results in the packing of seams, such as shown in Fig. 2.

While many rubbers are resistant to deterioration when exposed to oils, they usually swell appreciably, particularly when in contact with hot oil. The characteristic of swelling in oil, which many rubbers possess, has been well known for some time. Tables have been prepared giving the amount of swelling of certain rubbers in oil. Reference is made to page 697, Lange's Handbook of Chemistry, 5th edition, published by Handbook Publishers, Incorporated. Therefore, any one skilled in the art can readily select the elastomer required when the conditions under which the packing material is to be utilized are known.

In preparing the composition of matter for packing purposes, rubbers may be selected which will swell sufficiently to meet any requirement that is found in the making of joints or seams. If a rubber does not have the desired swelling characteristics, the swelling of the final product can be controlled to an appreciable extent by employing fillers which are inert to the liquids to be sealed against as, for example, oil which is the liquid referred to in the preferred embodiment described. The composition of matter or packing material may be prepared in many different forms. One of the most convenient forms for applying to threaded and rolled joints, is a viscous paste. When the packing material has been prepared in this manner, it can be applied by hand, brush or by the use of a caulking gun.

The packing material may also be prepared in the form of a sheet, either entirely of the new material or applied to a fabric. It is to be understood that the form in which the packing material or composition of matter is prepared is secondary to the characteristics and capacity for performing the functions hereinbefore set forth. The form of the compositions of matter will depend on the purpose for which the material is to be utilized.

In order to prepare a packing material in accordance with this invention, a suitable rubber is selected. Good results have been obtained using one or more of the following:

"Butaprene," Type NXM, NAA, NL, NF (butadiene acrylonitrile copolymers).
"Hycar," Type OR-15 or Type OR-25 (butadiene acrylonitrile copolymers).
"Hycar," Type OS-10 (butadiene styrene copolymers).
"Chemigum," Type N-3, N-4 (butadiene acrylonitrile copolymers).
"Chemigum," Type GR-S (butadiene styrene copolymers).
"Chemigum," Type GR-I (isoprene isobutylene copolymers).

In general, the elastomers named swell sufficiently in transformer oil to give effective sealing when used in joints in the manner described hereinbefore. Another example of an elastomer that may be employed for sealing is neoprene, which is a chlorobutadiene polymer. It may be used alone or mixed with other synthetic rubbers. In general, the rubber selected will depend upon the viscosity and type of hydrocarbon oil used in the equipment to be sealed. When sealing against a highly aromatic oil, the rubber selected should show approximately 50% to 100% increase in volume whereas if the seal is for oil highly paraffinic in nature, a rubber may be chosen which shows swelling of the order of 50% or greater in the particular oil to which it is to be exposed.

The particles of rubber may be retained in position in the joint by the use of a suitable resin for bonding. Innumerable resins may be utilized and success has resulted from the use of shellac, ethyl cellulose, natural gums and resins, alkyd-type resins, polyvinyl butyral and polyvinyl acetal.

In order to make a viscous paste out of the rubber and resin to facilitate application, a volatile solvent for the resin is employed. The solvent must be one that will not cause the rubber to swell or otherwise deteriorate. In preparing pastes from the rubbers and resins described, it was found that in general the rubber would not swell or be rendered ineffective in monohydric aliphatic hydrocarbon alcohols, such for example, as methyl alcohol, ethyl alcohol, isopropyl alcohol, normal propyl alcohol, normal butyl alcohol, normal amyl alcohol, and capryl alcohol. The foregoing solvents while they will not materially affect the rubber may be employed to dissolve the resins enumerated hereinbefore.

It will be readily appreciated that the problems met with in different joints will require different pastes. It has been found that it is desirable in meeting the different problems that anywhere from 10% to 90% of solids be deposited in the joints to which the paste is applied. The solids deposited will be the rubber and resin left after the solvent has evaporated. Generally, the amount of resin employed will depend on the amount required to give the desired bonding of the rubber particles to one another and to the members constituting the joint. This can readily be determined by any one skilled in the art.

The amount of solvent used can readily be determined by experimental work when the conditions under which the paste to be applied are known. In the preparation of the paste, the desired quantity of the selected resin, either a single resin or a mixture of resins, is dissolved in the solvent and the rubber added. The rubber is then mixed in until it is thoroughly distributed through the solution of resin.

A paste that was used to seal threaded joints and rolled seams in manufacturing operation was analyzed and found to comprise the following:

| | Percent |
|---|---|
| Butadiene styrene copolymer | 30 |
| Shellac | 50 |
| Ethyl alcohol | 20 |

This composition was applied to thousands of threaded joints and practically no leakage of oil was experienced. It was also used in hundreds of rolled seams with the same results.

In application, a predetermined amount of the paste will be applied to the member 10 shown in Fig. 1, which is provided with an external thread shown at 11. The member 12 having an internal thread 13 is then threaded onto the member 10. It may be desirable to apply some of the paste to the internal thread 13.

In the case of a rolled joint, such as shown in Fig. 2, and which may be used in making transformer tanks, the paste will be pumped into position between the turns of the metal 14. It is desirable that the paste be forced into position under pressure and for this purpose a tool such as a caulking gun 15 may be utilized.

When the paste has been applied as in the manner described and allowed to stand for some time, the solvent will evaporate and the resins will be deposited with the rubber and will bond the rubber to the members of the joint. If the packing material is now exposed to a liquid such as hot oil, it will begin to swell and will tightly seal the joint. Investigation has shown that the rubber will in some instances swell as much as 50% of its original volume. In other words, the packing will have a final volume equal to 150% of its volume as a paste. In this way, all voids that have been formed by the evaporation of the solvent will be filled and the joint tightly sealed.

If the paste has been applied in the manufacture of equipment sold to the public generally, as, for example, transformers or other electrical apparatus in which oil is employed and the customer proceeds to tighten the joints, he may cause some cracks and voids in the joints. However, the rubber when again exposed to hot oil and the like will expand further and restore the tight seal that existed after the original making of the joint.

Since certain changes may be made in the above composition of matter and different embodiments of the invention made without departing from its scope, it is intended that all matter contained in the above description shall be interpreted as illustrative and not in a limiting sense.

I claim as my invention:

1. A joint packing composition which, when applied to joints of containers having oil in contact with the joint, will swell upon contact of the oil with the composition and thereby seal the joint, consisting essentially of approximately 30% by weight of a rubbery butadiene styrene copolymer, the copolymer being present as particles of a fineness of the order of 100 mesh, about 50% by weight of shellac and about 20% by weight of ethyl alcohol as a solvent for the shellac.

2. A joint packing composition which, when applied to joints of containers having oil in contact with the joint, will swell upon contact of the oil with the composition and thereby seal the joint, consisting essentially of approximately 30% by weight of a rubbery butadiene styrene copolymer, the copolymer being present as particles of a fineness of the order of 100 mesh, a resin insoluble in oil but soluble in an aliphatic hydrocarbon monohydric alcohol, and about 20% by weight of a solvent for the resin composed of an aliphatic hydrocarbon monohydric alcohol.

JAMES G. FORD.

REFERENCES CITED

The following references are of record in the file of this patent:

UNITED STATES PATENTS

| Number | Name | Date |
| --- | --- | --- |
| 1,688,500 | Kulas | Oct. 23, 1928 |
| 2,381,248 | Bascom | Aug. 7, 1945 |
| 2,433,656 | Egan et al. | Dec. 30, 1947 |
| 2,501,654 | Brams | Mar. 28, 1950 |

FOREIGN PATENTS

| Number | Country | Date |
| --- | --- | --- |
| 517,816 | Great Britain | of 1940 |